US012743810B2

(12) United States Patent
Nagesh et al.

(10) Patent No.: US 12,743,810 B2
(45) Date of Patent: Sep. 22, 2026

(54) OBJECT POSE GENERATION VIA TRAINED NETWORK

(71) Applicant: Ford Global Technologies, LLC, Dearborn, MI (US)

(72) Inventors: Sushruth Nagesh, Mountain View, CA (US); Shubham Shrivastava, Santa Clara, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 359 days.

(21) Appl. No.: 18/489,263

(22) Filed: Oct. 18, 2023

(65) Prior Publication Data

US 2025/0131585 A1 Apr. 24, 2025

(51) Int. Cl.
*G06T 7/73* (2017.01)
*B60W 30/09* (2012.01)
(Continued)

(52) U.S. Cl.
CPC ............... *G06T 7/73* (2017.01); *B60W 30/09* (2013.01); *G06T 7/50* (2017.01); *G06V 20/58* (2022.01);
(Continued)

(58) Field of Classification Search
CPC ....... G06T 7/73; G06T 7/50; B60K 2360/166; B60K 2360/21; B60K 35/28
See application file for complete search history.

(56) References Cited

U.S. PATENT DOCUMENTS

2018/0240221 A1 8/2018 Rijnders
2021/0118219 A1* 4/2021 Chui ....................... G06T 17/00
(Continued)

FOREIGN PATENT DOCUMENTS

CN 112634341 A 4/2021
CN 115512326 A 12/2022
(Continued)

OTHER PUBLICATIONS

Vaswani, Ashish, Noam Shazeer, Niki Parmar, Jakob Uszkoreit, Llion Jones, Aidan N. Gomez, Łukasz Kaiser, and Illia Polosukhin. "Attention is all you need." Advances in neural information processing systems 30 (2017). (Year: 2017).*
(Continued)

*Primary Examiner* — Stephen R Koziol
*Assistant Examiner* — Ashley Hytrek
(74) *Attorney, Agent, or Firm* — Frank A. MacKenzie; Brooks Kushman P.C.

(57) ABSTRACT

A computer includes a processor and a memory, and the memory stores instructions executable by the processor to extract a feature of an object viewable in a scene captured by a camera at a first perspective. The instructions can also be to transform the scene from the first perspective to a second perspective based on a parameter generated responsive to (a) a reconstruction of the scene from the first perspective based on the scene from the second perspective, and (b) an adjustment of the parameter to minimize differences between the extracted feature and a representation of the extracted feature reconstructed based on the second perspective. The instructions can also be to determine a depth of the extracted feature with respect to the camera based on the parameter and to determine the pose of the object based on the determined depth.

20 Claims, 4 Drawing Sheets

(51) Int. Cl.
*G06T 7/50* (2017.01)
*G06V 20/58* (2022.01)

(52) U.S. Cl.
CPC ............... *G06T 2207/10028* (2013.01); *G06T 2207/30252* (2013.01)

(56) References Cited

U.S. PATENT DOCUMENTS

| | | | | |
|---|---|---|---|---|
| 2021/0150203 | A1* | 5/2021 | Liu | G06T 7/11 |
| 2021/0150252 | A1 | 5/2021 | Sarlin et al. | |
| 2023/0049567 | A1 | 2/2023 | Popov et al. | |
| 2023/0071437 | A1 | 3/2023 | Kim et al. | |
| 2023/0230385 | A1* | 7/2023 | Tananaev | G06V 10/44 348/148 |
| 2024/0020953 | A1* | 1/2024 | Park | G06V 20/56 |
| 2025/0078396 | A1* | 3/2025 | Kannan | G06T 17/00 |
| 2025/0200770 | A1* | 6/2025 | Hu | G06T 7/73 |

FOREIGN PATENT DOCUMENTS

| | | | | |
|---|---|---|---|---|
| CN | 116071721 | A | 5/2023 | |
| CN | 116109923 | A | 5/2023 | |
| EP | 4115145 | A1 | 1/2023 | |
| EP | 4115318 | A1 | 1/2023 | |
| WO | 2022157230 | A1 | 7/2022 | |
| WO | 2022223631 | A2 | 10/2022 | |
| WO | WO-2024001969 | A1 * | 1/2024 | G06V 20/56 |

OTHER PUBLICATIONS

Zhao, Yun, Yu Zhang, Zhan Gong, and Hong Zhu. "Scene Representation in Bird's-Eye View From Surrounding Cameras With Transformers." In Proceedings of the IEEE/CVF Conference on Computer Vision and Pattern Recognition, pp. 4511-4519. 2022. (Year: 2022).*

Wimbauer, Felix, Nan Yang, Christian Rupprecht, and Daniel Cremers. "Behind the scenes: Density fields for single view reconstruction." In Proceedings of the IEEE/CVF Conference on Computer Vision and Pattern Recognition, pp. 9076-9086. Jun. 2023. (Year: 2023).*

Borse, Shubhankar, Marvin Klingner, Varun Ravi Kumar, Hong Cai, Abdulaziz Almuzairee, Senthil Yogamani, and Fatih Porikli. "X-align: Cross-modal cross-view alignment for BEV segmentation." . . . IEEE/CVF Winter Conference on Applications of Computer Vision, pp. 3287-3297. Jan. 2023. (Year: 2023).*

Zhao, Y., et al., "Scene Representation in Bird's-Eye View from Surrounding Cameras with Transformers," Computer Vision Foundation, 2022, 9 pages.

Vaswani, A., et al., "Attention Is All You Need," arXiv:1706.03762v5 [cs.CL] Dec. 6, 2017, 15 pages.

* cited by examiner

OBJECT POSE GENERATION VIA TRAINED NETWORK

BACKGROUND

Modern vehicles typically include a variety of sensors. Some sensors detect static or moving objects external to the vehicle, such as other vehicles, lane markings of a roadway, traffic lights and/or signs, animals, natural objects, etc. Types of vehicle sensors can include radar sensors, ultrasonic sensors, scanning laser range finders, sensors of a satellite positioning system (e.g., GPS), and light detection and ranging (lidar) devices.

DETAILED DESCRIPTION

Figure 1:
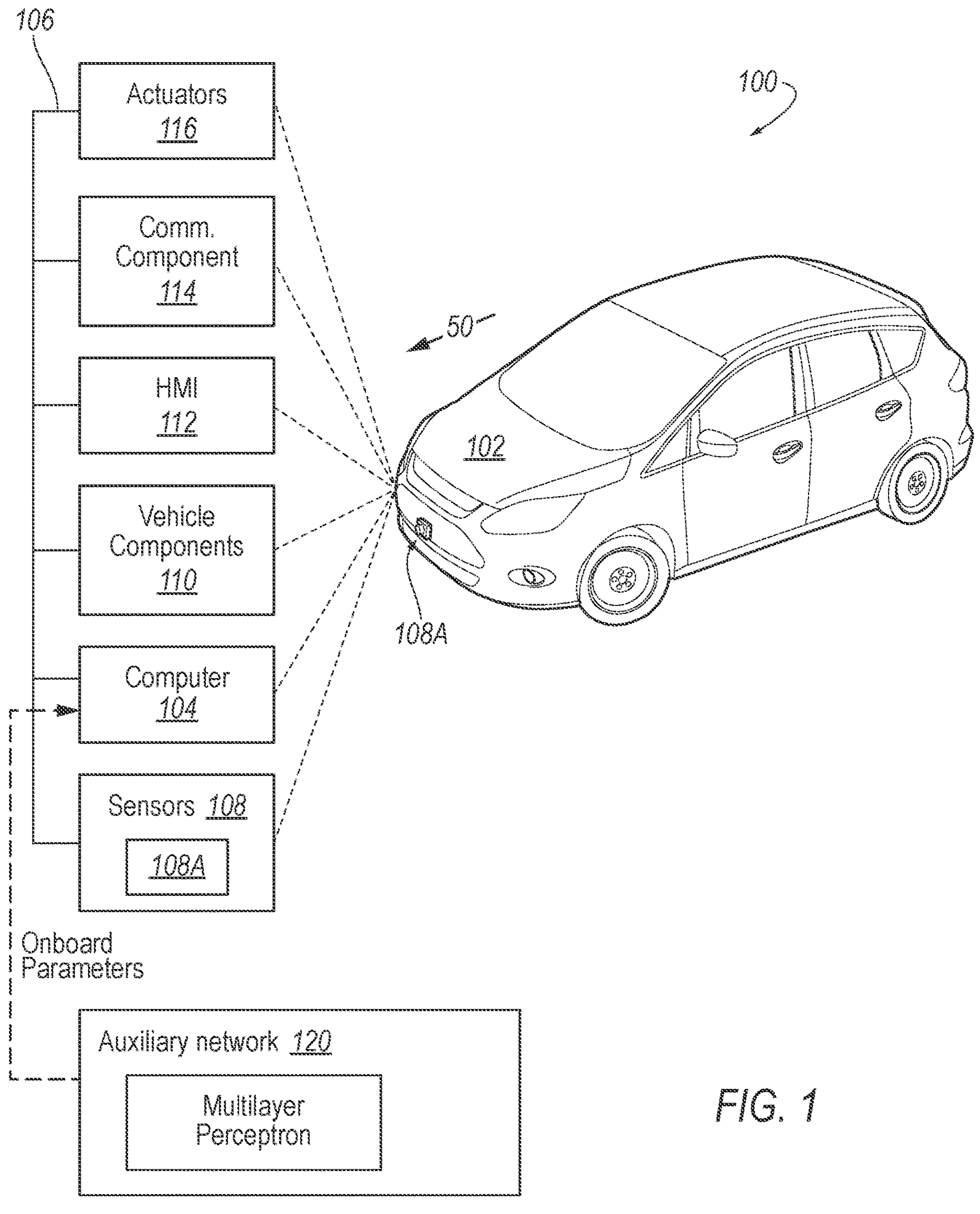
FIG. 1 is a block diagram of an example vehicle.

This disclosure describes techniques that can be provided for control or operation of a machine including techniques to compute a pose of static or moving objects viewable by a camera sensor (e.g., a camera to capture still or video scenes) utilizing a representation of a scene obtained via output signals from the camera sensor. In an example, a scene can be captured by a camera sensor, such as a camera sensor mounted on a vehicle, from a first perspective. Features, such as static or moving objects, present in the captured scene can be detected, augmented, and transformed from the first perspective to a second perspective, e.g., an overhead view perspective, a bird's-eye view perspective, etc. Responsive to transformation to the second perspective, a computer can execute instructions to determine spatial relationships, e.g., angular orientation and depth with respect to the camera sensor, among features detected in the captured scene. Based on the spatial relationships among the features detected of the captured scene, the computer can execute instructions to determine the depth of static or moving objects in the scene with respect to the camera sensor, assign semantic labels to objects in the scene, and determine the pose of the static or moving objects in the scene. The computer can additionally execute instructions to plan motion of, for example, a vehicle on which the camera sensor is mounted. Further, the computer can execute instructions to implement an autonomous driving application, which may include autonomously actuating steering components, actuating vehicle propulsion components, etc., based on the pose of the static or moving objects in the scene.

In an example, rather than a computer (e.g., a computer onboard a vehicle) executing a geometry-based computation to transform a scene from a first (camera) perspective to a second (overhead view) perspective that utilizes properties intrinsic to a camera sensor (e.g., the focal length of a camera sensor) and scene geometry (e.g., vertical vanishing point of a scene), etc., the computer may utilize parameters developed by an auxiliary network that trains the computer to perform the transform. In this context a "transform" means a translation or representation of points of a scene captured from a first perspective to a second perspective or from a second perspective to a first perspective, i.e., a transform includes a translation from a first coordinate system to a second coordinate system. In an example, a translation of pixels representing a scene captured from a first (camera) perspective to a second (overhead view) perspective may utilize a rotation matrix that computes a cosine of an angle with respect to the horizon and represents the pixels in the form of a linear distance from a reference point of the second (overhead view) perspective. In another example, for a vehicle computer that implements a neural network (e.g., a multilayer perceptron), rather than the vehicle computer consuming processing resources to develop weights at hidden layers of the neural network to represent pixels of a scene captured from a first (camera perspective) to a second (overhead view) perspective, the computer may utilize parameters derived from weights developed within the auxiliary network. Accordingly, in either instance (i.e., the computer executing a geometry-based transform or the computer implementing a neural network), parameters developed or derived from an auxiliary network can be utilized to train the computer to transform a scene captured in a first (camera) perspective to a second (overhead view) perspective. As the term is used herein, an "auxiliary network" means a network, operating external to a vehicle network, which is connected or coupled to the vehicle network during a training, manufacturing, or calibration process.

As described herein, transforming a scene captured from a first perspective to a second perspective can be executed utilizing one or more parameters stored in a memory that is accessed by, for example, a vehicle computer. In an example, the one or more parameters can be generated or derived from a multilayer perceptron that operates to train or instruct the vehicle computer so that the transformation of the scene can be performed with increased accuracy and with decreased computational resources. In this context a "parameter" is a value that is utilized by a vehicle computer to control or influence vehicle operation. A "parameter" herein means a numeric value or values, and may include a scalar quantity, e.g., a floating-point value having a magnitude of between −1 and +1, between −100 and +100, etc., or may include a vector, e.g., a floating-point value having a magnitude and a direction. Thus, for example, programming of a vehicle computer (e.g., computer 104) may utilize a parameter to transform a scene captured from a first perspective (e.g., a camera perspective) to a second (e.g., an overhead view) perspective.

In this context, a "multilayer perceptron" means a fully connected feed-forward artificial neural network having at least three layers (an input layer, an output layer, and at least one hidden layer). In an example, an auxiliary network (e.g. 120), can include a multilayer perceptron. In an example, an input layer of a multilayer perceptron operates to receive a query, and an output layer operates to provide a decision or prediction responsive to the received query. The hidden layer of the multilayer perceptron operates as a computing resource that is capable of approximating many continuous functions. In this context, a "continuous function" means a five-dimensional vector-valued function (e.g., $F(x, y, z, \theta, \phi)$) that expresses a three-dimensional location (e.g., an x coordinate, a y coordinate, and a z coordinate) and a two-dimensional viewing direction (e.g., a pitch axis angle ($\theta$), and a yaw axis ($\phi$) angle), a volume density for each point of the scene is rendered by the multilayer perceptron. In an example, the continuous function may be with respect to a novel pose (e.g., an x coordinate, a y coordinate, and a z coordinate, a pitch axis angle (θ), and a yaw axis (ϕ) angle) of a camera sensor (e.g., camera sensor 108A).

In an example, the multilayer perceptron of an auxiliary network can generate a parameter, which can be used by a vehicle computer, by reconstructing a scene from the first perspective based on the scene transformed to a second perspective. The multilayer perceptron can enforce consistency between the scene captured from the first perspective and reconstructed from the second perspective at a feature level, an image level, and a task output level that utilizes feature maps of the multilayer perceptron. In this context, to "enforce consistency" means to adjust or modify one or more weights of a hidden layer of a multilayer perceptron so that losses at a feature level, an image level, and/or a feature map layer can be reduced or minimized. An outcome of an operation to enforce consistency at a feature level, an image level, and a task output level of a multilayer perceptron can include adjusting weights applied to a pixel map of a scene captured by a camera, coefficients of polynomials utilized by image processing programming of a vehicle computer, or entries in a lookup table utilized by a vehicle computer during the process of transforming a scene captured from a first perspective to a second perspective. In this context, the term "feature loss" means a difference between the position or geometry of a feature reconstructed from a second perspective view and the position or geometry of a feature extracted from the scene from a first (e.g., camera) perspective. Also in this context, the term "image loss" means a difference between a dimension of an image of a scene reconstructed from a second perspective view and a dimension of the image of the scene captured from a first (e.g., camera) perspective. Further, in this context, the term "feature map loss" means a difference between a feature map generated by the output layer of the multilayer perceptron (e.g., a corner, an edge, center point) from a scene reconstructed from a second perspective view and a scene captured from a first (e.g., camera) perspective.

In an example, a system can include a computer having a processor and a memory, in which the memory includes instructions executable by the processor to extract a feature of an object viewable in a scene captured by a camera at a first perspective and to transform the scene from the first perspective to a second perspective based on a parameter generated responsive to (a) reconstruction of the scene from the first perspective based on the scene from the second perspective, and (b) adjustment of the parameter to minimize differences between the extracted feature and a representation of the extracted feature reconstructed based on the second perspective. The instructions can additionally be to determine a depth of the extracted feature with respect to the camera based on the parameter and to determine the pose of the object based on the determined depth.

In an example, the instructions can additionally be to actuate a vehicle component based on the determined pose of the feature.

In an example, the vehicle component can be a steering component or a propulsion component.

In an example, the second perspective can be an overhead view.

In an example, the parameter can be derived from a weight of a multilayer perceptron that is learned responsive to the reconstruction of the scene from the first perspective based on the scene from the second perspective.

In an example, the second perspective can be a bird's-eye view in an example, the reconstruction of the scene can include instructions to convert pixels of the scene from the second perspective to a polar coordinate system.

The reconstruction of the scene can include wherein the reconstruction of the scene includes instructions to transmit a query and a position key in the polar coordinate system to a multilayer perceptron.

The reconstruction of the scene can include instructions to transmit a query and a position key in the polar coordinate system to a multilayer perceptron, and wherein the instructions further include instructions to compute an attention weight.

In an example, the adjustment of the parameter includes instructions to implement bilinear interpolation between a dimension of the extracted feature and a dimension of the representation of the extracted feature by a multilayer perceptron.

In an example, adjustment of the parameter includes instructions to minimize differences between the scene captured at the first perspective and a reconstruction of the captured scene from the second perspective.

In an example, adjustment of the parameter includes instructions to minimize differences between a first task output feature map obtained for the scene captured at the first perspective and a second task output feature map obtained for the extracted feature reconstructed based on the second perspective.

In an example, a method can include extracting a feature of an object viewable in a scene captured by a camera at a first perspective. The method can additionally include transforming the scene from the first perspective to a second perspective based on a parameter generated responsive to (a) reconstructing of the scene from the first perspective based on the scene from the second perspective, and (b) adjusting the parameter to minimize differences between the extracted feature and a representation of the extracted feature reconstructed from on the second perspective. The method can additionally include determining a depth of the extracted feature with respect to the camera based on the parameter and determining the pose of the object based on the determined depth.

In an example, the method can additionally include actuating a vehicle component based on the determined pose.

In an example, the vehicle component can be a steering component or a steering component or a propulsion component.

In an example, the second perspective can be an overhead view.

In an example, the second perspective can be a birds'-eye view.

In an example, the parameter can be derived from a weight of a multilayer perceptron that is learned responsive to the reconstructing of the scene from the first perspective based on the scene from the second perspective.

In an example, adjusting the parameter includes implementing a bilinear interpolation between a dimension of the extracted feature from the captured scene and a dimension of the representation of the extracted feature reconstructed by a multilayer perceptron.

In an example, adjusting the parameter includes minimizing differences between the scene captured at the first perspective and a reconstruction of the captured scene from the second perspective.

In an example, adjusting the parameter includes minimizing differences between a first task output feature map obtained for the scene captured at the first perspective and a second task output feature map obtained for the scene reconstructed based on the second perspective.

With reference to FIG. 1, vehicle 100 can be any passenger or commercial automobile such as a car, a truck, a recreational vehicle, a sport utility vehicle, a crossover, a van, a minivan, a taxi, a bus, etc. Vehicle 100 can include computer 104, communications network 106, sensors set 108, vehicle components 110, human-machine interface (HMI) 112, communications interface 114 (e.g., to provide Wi-Fi communications, communications with a satellite or terrestrial network, communications with other vehicles, etc.), and actuators 116. Sensor set 108 may include a lidar sensor, a long-range radar sensor, an ultrasonic sensor, and camera sensor 108A. Sensor set 108 can additionally include navigation sensors, such as sensors of a satellite positioning system (e.g., GPS), sensors of an inertial measurement unit, etc.

In an example, camera sensor 108A can be mounted on body 102 of vehicle 100. Camera sensor 108A can include a camera for capturing still or video scenes that include objects, such as stationary or moving vehicles, animals, natural objects, lane markings, traffic signs, etc., which are located external to vehicle 100. In an example, camera sensor 108A can operate to detect electromagnetic radiation in a range of wavelengths. For example, camera sensor 108A can detect visible light, infrared radiation, ultraviolet light, or some range of wavelengths including visible, infrared, and/or ultraviolet light. For example, camera sensor 108A can include image sensors such as charge-coupled devices (CCD), active-pixel sensors such as complementary metal-oxide semiconductor (CMOS) sensors, etc.

Vehicle components 110 include a propulsion system to translate stored energy (e.g., gasoline, diesel fuel, electric charge) into motion to propel vehicle 100. Vehicle components 110 may include a conventional vehicle propulsion subsystem, for example, a conventional powertrain including an internal-combustion engine coupled to a transmission that transfers the torque generated by the engine to the wheels of vehicle 100. Vehicle components 110 can also include a hybrid powertrain that utilizes elements of the conventional powertrain and an electric powertrain; or may include another type of powertrain. Vehicle components 110 can include an electronic control unit (ECU) or the like that is in communication with, and/or receives input from, computer 104 and/or a human operator. The human operator may control the propulsion system and/or a gear-shift lever.

Vehicle components 110 can include a conventional vehicle steering subsystem to control the turning of the wheels of vehicle 100. The steering subsystem may include rack-and-pinion steering members with electric power-assisted steering, a steer-by-wire system, or another suitable system. The steering subsystem can include an electronic control unit (ECU) or the like that is in communication with and receives input from computer 104 and/or a human operator. The human operator may control the steering subsystem via, e.g., a steering wheel.

HMI 112 presents information to and receives information from an operator of vehicle 100. HMI 112 may include controls and displays positioned, for example, on an instrument panel in a passenger compartment of vehicle 100 or may be positioned at another location that is accessible to the operator of vehicle 100. HMI 112 can include dials, digital readouts, screens, speakers, etc., for providing information to the operator of vehicle 100. HMI 112 can include buttons, knobs, keypads, microphones, and so on for receiving information from the operator.

Vehicle 100 can additionally include actuators 116, which operate to apply a mechanical or electromotive force to control an aspect of vehicle 100. For example, actuators 116 may include a steering actuator, which operates to modify the orientation of the front wheels of vehicle 100, such as during autonomous or semi-autonomous vehicle operation. In another example, actuators 116 may include a propulsion actuator, which operates to reposition a throttle control of vehicle 100 to increase or decrease the speed of vehicle 100.

Computer 104 of vehicle 100 can include a microprocessor-based computing device, e.g., a generic computing device, which includes a processor and a memory, an electronic controller or the like, a field-programmable gate array (FPGA), a system-on-a-chip, an application-specific integrated circuit (ASIC), a combination of the foregoing, etc. In an example, a hardware description language such as VHDL (VHSIC (Very High Speed Integrated Circuit) Hardware Description Language) can be utilized in electronic design automation to describe digital and mixed-signal systems, such as FPGA and ASIC. For example, an ASIC is manufactured based on VHDL programming provided pre-manufacturing, whereas logical components inside an FPGA may be configured based on VHDL programming, e.g., stored in a memory coupled to the FPGA circuit. Computer 104 can thus include a processor, a memory, etc. A memory of computer 104 can include a tangible media for storing instructions executable by the processor as well as for electronically storing data and/or databases. Alternatively or in addition, computer 104 can include structures such as the foregoing by which programming is provided. In an example, computer 104 can be multiple computers coupled together to operate as a single computing resource.

Computer 104 may transmit and receive data through communications network 106. Communications network 106 can include, e.g., a controller area network (CAN) bus, Ethernet, WiFi, Local Interconnect Network (LIN), onboard diagnostics connector (OBD-II), and/or another wired or wireless communications network. Computer 104 may be communicatively coupled to camera sensor 108A, vehicle components 110, HMI 112, communications interface 114 and other vehicle systems and/or subsystems via communications network 106.

Computer 104 may execute instructions to perform image processing of scenes captured via camera sensor 108A. As described in greater detail in reference to FIGS. 2 and 3, computer 104 can operate to extract features from scene images and to identify and/or classify such features, such as features representing static or moving objects external to vehicle 100. In this context a "feature" means a datum or data describing, or identifying an attribute of, the content of an image of a scene, typically with respect to a physical property or characteristic included (or not included) in a specified region of the image. In an example, a feature can include information regarding facets of an image of a scene such as points, edges, or objects. A first feature may also be determined in response to detection of points, edges, or objects of a second feature that may be adjacent to or nearby the first feature in an image. Thus, for example, computer 104 may execute instructions to identify a moving object as another vehicle traveling along a path 50 in a direction that is forward of vehicle 100. Computer 104 can additionally execute instructions to augment detected objects, such as by rendering detected objects inside of bounding boxes, highlighting aspects of detected objects with a descriptor (e.g., an arrow, a line, a distance indicator, etc.). Further, computer 104 can additionally execute instructions to transform an image of a scene captured from a first perspective (e.g., a perspective of camera sensor 108A) to a second perspective, such as a perspective that is overhead of vehicle 100. In an example, computer 104 can utilize parameters stored within a memory accessible to computer 104, which may include constants, adjustable weights, coefficients of a polynomial, entries of a lookup table, etc.

In the example of FIG. 1, auxiliary network 120 can be coupled to communications network 106 during a manufacturing or testing phase of vehicle 100. As described in relation to FIGS. 2, 3, and 4, parameters stored within a memory accessible to computer 104 can be developed and refined by auxiliary network 120. In an example, auxiliary network 120 includes the multilayer perceptron described hereinabove. The multilayer perceptron of auxiliary network 120 can operate to receive output data from camera sensor 108A, and programming of computer 104, to obtain a representation of a scene captured via camera sensor 108A and transformed into a scene from a second perspective. The multilayer perceptron of auxiliary network 120 can operate to reconstruct the scene from the perspective of camera sensor 108A utilizing an overhead view of the transformed scene. Auxiliary network 120 can then compute losses and enforce consistency so as to reduce or minimize differences between the reconstructed scene and the original image captured via camera sensor 108A. Auxiliary network 120 can then upload parameters generated or derived in response to enforcing consistency between the reconstructed scene and the original scene for use by computer 104 during actual use of vehicle 100. By way of uploading parameters generated or derived by auxiliary network 120, computer 104 can be trained so as to reduce computing resources involved in transforming a scene captured from a first (camera sensor) perspective to a second (overhead view) perspective.

Exemplary System Operations

Figure 2:
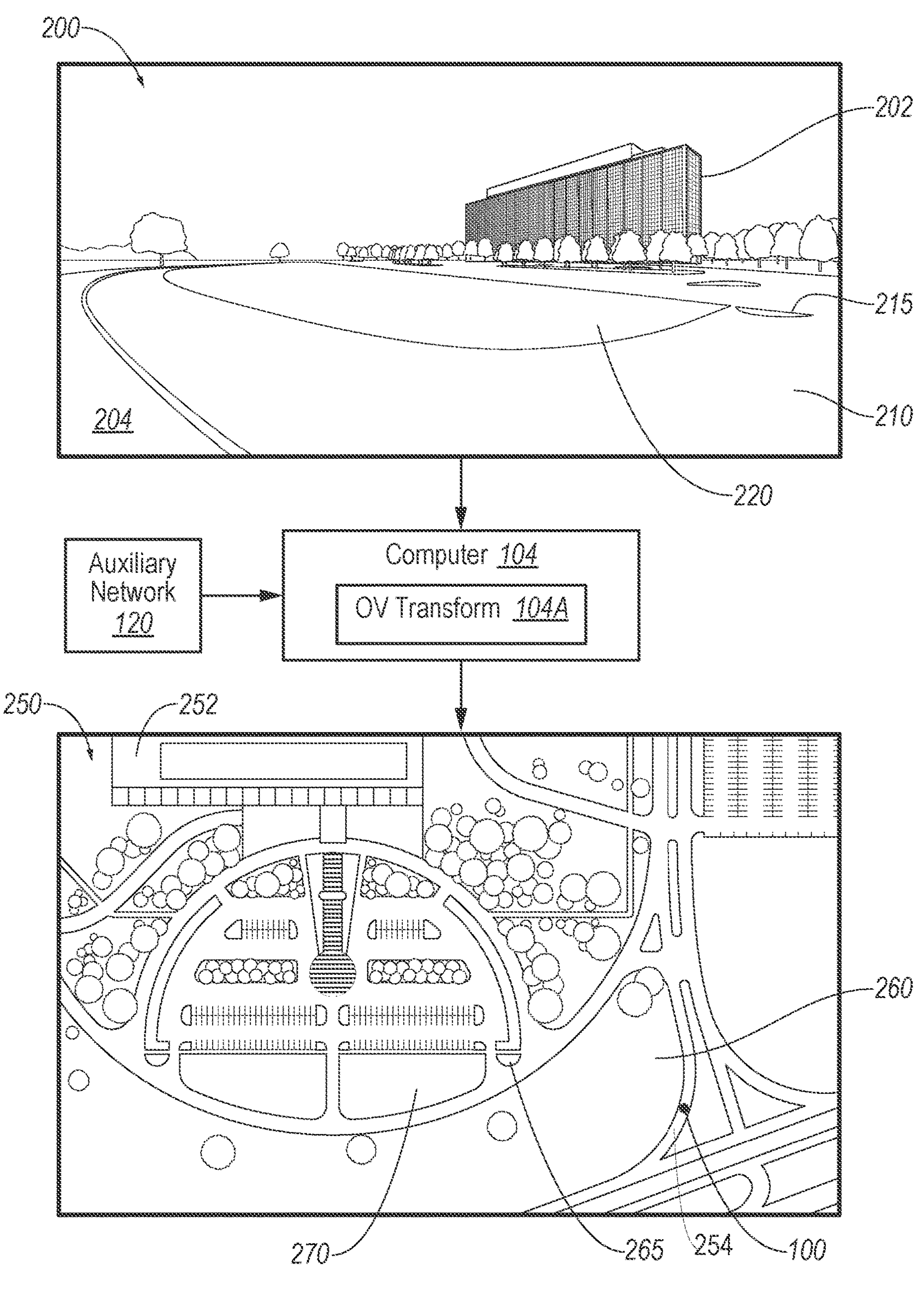
FIG. 2 is an example view of a scene from a first perspective and from a second perspective.

FIG. 2 illustrates first and second example views of an area, a first view being illustrated by scene 200 from a first perspective, and a second view being illustrated by view 250 from a second perspective. Scene 200 represents a scene captured via camera sensor 108A. Scene 200 includes images of building 202 along with parking lot features 215 and 220. Scene 200 additionally includes open area feature 210, which can represent a grass-covered field adjacent to roadway 204. Scene 200 includes numerous additional features, such as trees, additional parking lot features, features within building 202, etc., which are not labeled. View 250 is a top-down (or overhead) view of the area depicted in scene 200.

As described in reference to FIG. 1, programming of computer 104 can implement an overhead view (OV) transform component 104A to translate images of scene 200 into overhead view 250. Overhead view 250 can be utilized to compute depth to objects detected in scene 200. As shown in overhead view 250 of FIG. 2, building 202 has been transformed from a first (camera) perspective to a second (overhead view) perspective shown as building 252. Parking lot features 215 and 220 have been transformed to an overhead view as represented by parking lot features 265 and 270 (respectively) of overhead view 250. Roadway 204 has been transformed to an overhead view as represented by roadway 254, and open area 210 has been transformed to an overhead view as represented by open area 260 of overhead view 250. In executing transformations of building 202, parking lot features 215 and 220, open area feature 210, and roadway 204, overhead view transform component 104A may be trained by auxiliary network 120 so that transformations of features present in scene 200, including depth from camera sensor 108A to a feature, can be performed utilizing reduced computing resources of computer 104.

Figure 3:
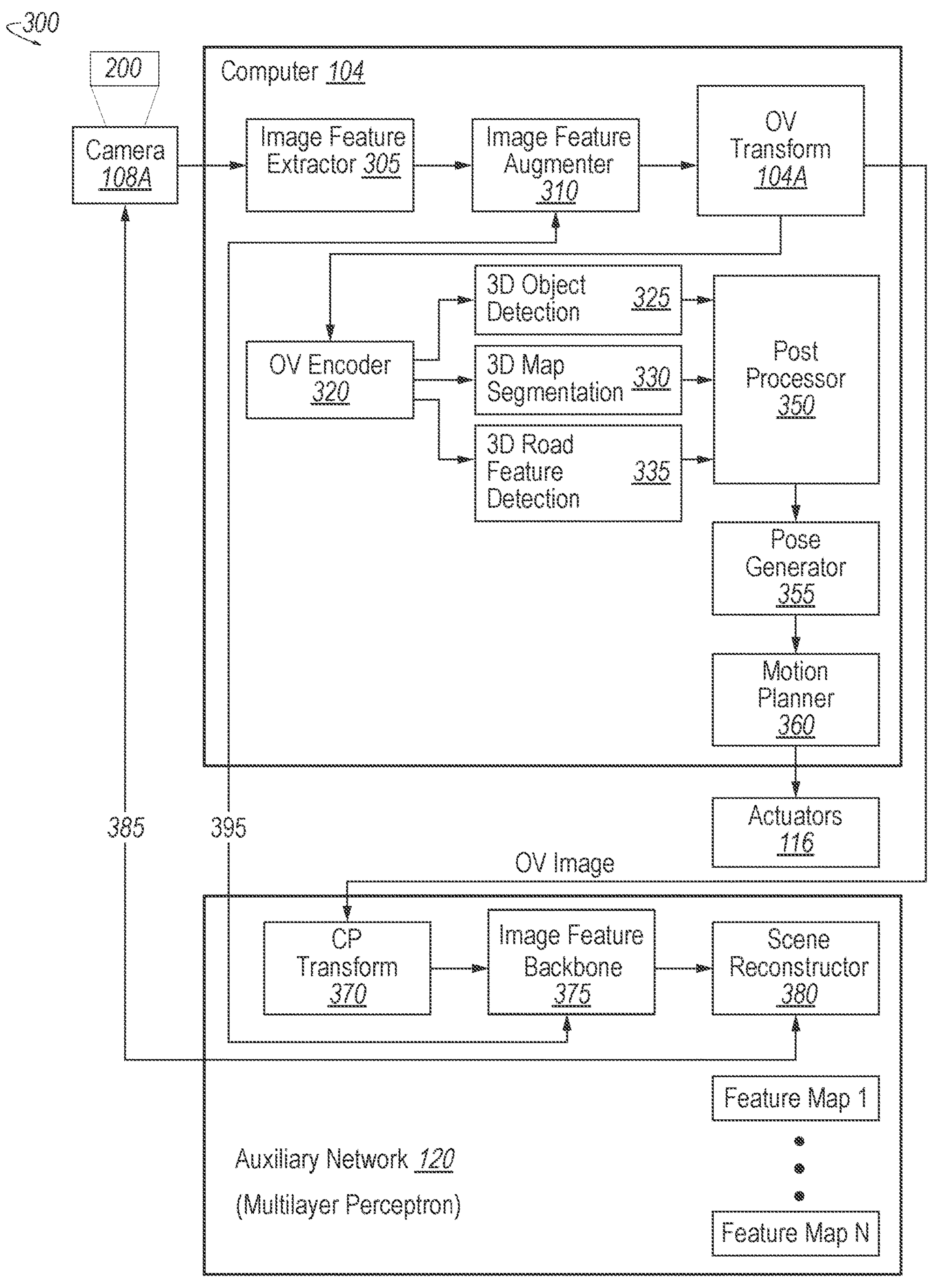
FIG. 3 is a schematic diagram of a system for object pose generation via a trained network.

FIG. 3 is a schematic diagram of system 300 for object pose generation via a trained network. As an overview of FIG. 3, computer 104 executes instructions to implement image feature extractor component 305, image feature augmenter component 310, and overhead view transform component 104A. Output signals from overhead view transform component 104A are utilized by overhead view encoder 320 to perform 3D object detection (via 3D object detection component 325), 3D map segmentation (via 3D map segmentation component 330), and 3D road feature detection (via 3D road feature detection component 335). Post processor component 350 executes instructions to obtain outputs from 3D object detection component 325, 3D map segmentation component 330, and 3D road feature detection component 335 for postprocessing, which applies confidence thresholding and non-maximal suppression to remove artifacts, which may be generated during 3D object detection, map segmentation, and 3D road feature detection components 325-335. Outputs from post processor component 350, which may include a lateral position (x-coordinate), a height (y-coordinate), and a depth (z-coordinate), are sent to pose generator 355, which generates the pose of the object viewed in the scene by camera sensor 108A. In response to output signals from pose generator 355, computer 104 can implement motion planning via motion planner component 360. Motion planner component 360 includes processing steps that operate as a part of an autonomous or semi-autonomous driving application, which may result in actuators 116 applying, for example, steering commands to a vehicle, propulsion commands, etc., based on the lateral position, height, and depth to objects external to vehicle 100.

Continuing with the discussion of FIG. 3, auxiliary network 120 can implement a multilayer perceptron that operates to provide training parameters to overhead view transform component 104A, which can operate to transform images of a scene captured in a first (camera) perspective to a second (overhead view) perspective. Auxiliary network 120 can include camera perspective transform component 370, which can receive and processes input signals representing the output of overhead view transform component 104A. Outputs from camera perspective transform component 370 can be sent to image feature backbone network 375. Output signals from image feature backbone network 375 can be sent to scene reconstructor 380. Auxiliary network 120 can operate to enforce consistency at an image level by minimizing loss between images captured by camera sensor 108A and images reconstructed via scene reconstructor 380. Auxiliary network 120 can additionally operate to enforce consistency between augmented features from image feature augmenter component 310 and features of images decoded via image feature backbone network 375. Auxiliary network 120 can further operate to enforce consistency between or among output feature maps within the multilayer perceptron of auxiliary network 120. Auxiliary network 120 can be connected or coupled to communications network 106 during a manufacturing, training, or calibration stage of vehicle 100.

In the example of FIG. 3, camera sensor 108A can operate to capture images in a first (camera) perspective of scenes within the field of view of camera sensor 108A. Digitized images from camera sensor 108A can be sent to image feature extractor component 305. Image feature extractor component 305 can operate to extract features of images of scene 200. In this context, to "extract features" means to apply a pixel processing technique that can operate to locate or identify points on an image that can be registered with similar points on other images. In the example of FIG. 3, image feature extractor component 305 can operate to detect edges, corners, blobs, ridges etc. Image feature extractor component 305 may operate by template matching, Hough transforms, and/or any other suitable techniques that operate to detect low-level features within images present in scene 200.

Image features extracted by image feature extractor component 305 can be sent to image feature augmenter component 310, which operates to apply, for example, color space augmentations, kernel filtering, image mixing, scaling, enhancing brightness and/or contrast, etc. In an example, image feature augmenter component 310 can operate as a feature learning component that can be trained to recognize features of images present in scene 200.

Overhead view transform component 104A can operate to translate images of scene 200 captured from a first (camera) perspective into a second perspective, such as depicted in FIG. 2 as overhead view 250. In an example, overhead view transform component 104A can represent a bird's-eye view or another type of geometrical image modification that represents an elevated view of scene 200. As described previously herein, overhead view transform component 104A can utilize programming to execute a geometry-based transform computation that accounts for properties intrinsic to camera sensor (e.g., the focal length of camera sensor 108A) and scene geometry (e.g., vertical vanishing point of scene 200), etc. Alternatively, or in addition, overhead view transform component 104A can utilize parameters developed by auxiliary network 120, which can operate to train overhead view transform component 104A to represent pixels of a scene captured from a first (camera perspective) to a second (overhead view) perspective.

Outputs from overhead view transform component 104A, which represent pixels of scene 200 rendered at a second (overhead view) perspective, can be sent to overhead view encoder 320. Overhead view encoder 320 can operate to detect and/or label features present in the second (overhead view) perspective. Thus, an output of overhead view encoder 320 can be sent to 3D object detection component 325, which may assign semantic labels to objects detected in the second (overhead view) perspective. Such semantic labels may include classes such as road markings, street or traffic signs, streetlamps, crosswalks, static or moving vehicles, etc.

An output of overhead view encoder 320 may additionally include 3D map segmentation component 330, which can operate to modify a representation of an image within a second (overhead view) of scene 200 by identifying images of overhead view 250 via bounding boxes, lines, curves, etc. Images of overhead view 250 can be segmented by way of thresholding pixels within overhead view 250, pixel clustering, histogram-based methods, and so forth. In an example, 3D map segmentation component 330 assigns a semantic label to respective pixels in an image such that pixels with a same semantic label share one or more characteristics.

An output of overhead view encoder 320 may additionally include 3D road feature detection component 335, which operates to identify points or features on the surface of, for example, roadway 204 and to determine the position and orientation of lanes of roadway 204. Alternatively or in addition, 3D road feature detection component 335 can operate by detecting edges or corners in roadway 204 and/or may utilize a pre-existing model of a road surface. In detecting road features such as lane lines, 3D road feature detection component 335 can operate to project virtual lines in between individual lane lines, so as to present a comprehensive picture of road features of roadway 204.

Outputs of 3D object detection component 325, 3D map segmentation component 330, and 3D road feature detection component 335 may be sent to post processor component 350, which applies confidence thresholding and non-maximal suppression to remove artifacts resulting from detection and segmentation components 325-335. In an example, post processor component 350 can utilize dilation and erosion algorithms, feature smoothing, heuristic filtering, sieving and closing, median filtering, clustering, etc.

Outputs of post processor component 350 can be sent to pose generator 355, which operates to determine the pose of objects in overhead view 250. Pose generator 355 may obtain signals other sensors of sensor set 108, such as, such as sensors of an inertial measurement unit, a satellite positioning system (e.g., GPS), a lidar sensor, a long-range radar sensor, an ultrasonic sensor, etc., to determine a motion vector of vehicle 100 in a global reference frame in relation to an object.

Outputs of pose generator 355 may be sent to motion planner component 360, which operates to plan motion of vehicle 100 based on the pose of objects in overhead view 250. Motion planner component 360 of vehicle 100 can provide steering commands to modify the motion vector of vehicle 100, provide propulsion commands and so forth. In an example, based on the pose of a static object, such as a road feature (e.g., a lane marking, a signpost, an abutment, etc.), motion planner component 360 may provide steering commands to adjust the path of vehicle 100. Outputs of motion planner component 360 can be sent to actuators 116, which operate to modify the direction of travel of vehicle 100, increase or decrease the velocity of vehicle 100 or to actuate another vehicle control involved in moving vehicle 100.

In the example of FIG. 3, auxiliary network 120 includes a camera perspective (CP) transform component 370. Camera perspective transform component 370 operates to receive output data from overhead view transform component 104A and execute the inverse of the operations executed by overhead view transform component 104A. Accordingly, in the example of FIG. 3, camera perspective transform component 370 executes programming to translate overhead view 250 from a second (overhead view) perspective to a first (camera) perspective.

In one example, instructions executed by camera perspective transform component 370 can operate to convert pixels of overhead view 250 from a first (Cartesian) coordinate system to a polar coordinate system. Accordingly, each pixel of overhead view 250 can be represented as (C, r, θ), where θ represents an angular coordinate, r represents a distance from a center point of overhead view 250, and C represents a feature dimension at a given pixel of overhead view 250. Conversion of a Cartesian coordinates (e.g., x, y, z pixel locations) to a polar coordinate system can be performed in accordance with expressions (1) and (2), below:

$$r = \sqrt{x^2 + y^2} \tag{1}$$

$$\theta = \arctan(y, x) \tag{2}$$

After converting overhead view 250 to a polar coordinate system, overhead view 250 can be divided into sectors, in which each sector measures, for example, a portion of the 360-degree circumference of a circle in the polar coordinate system. Accordingly, a sector may measure, for example, 1° of arc, 2° of arc, 3° of arc, or any other suitable subdivision of a polar coordinate representation of overhead view 250.

Pixels of overhead view 250 may be arranged into columns having a shape $C \times h_p$. A reconstruction of overhead view 250 can be represented by $(C, h_p, w_p)$. In such an arrangement, a polar-coordinate subdivision $(p_s)$ can include a shape of $C \times r$. Two matrices can then be defined: $W_Q$, which includes a query vector having a shape $C \times C'$, and $W_K$, which can include a position key vector having a shape $C \times C'$. A key matrix for each sector of the polar coordinate representation of each pixel of overhead view 250 can then be defined in accordance with expression (3), below:

$$K(p_s) = (p_s)^T W_k \tag{3}$$

wherein $K(p_s)$ is the position key vector and wherein $((p_s)^T W_k)$ denotes the transformation matrix for each pixel of a polar-coordinate subdivision $(p_s)$. Sinusoidal position encoding can then be defined for each column in a first (camera) perspective as $p_e$. Thus, queries $(Q(p_e))$ for each pixel of overhead view 250 can be computed by the multilayer perceptron of auxiliary network 120 in accordance with expression (4), below:

$$Q(p_e) = (p_e)^T W_Q \tag{4}$$

It is noted that although sinusoidal position encoding is utilized for each column in a first (camera) perspective, another suitable encoding technique could be applied in expressions (3) and (4). Another suitable encoding technique could be any encoding technique that results in a value of between 0 and 1 for each pixel in a column of the second (overhead) perspective of view 250.

Following query submittal to the multilayer perceptron of auxiliary network 120, a dot product can be computed between each query $(Q(p_e))$ and all key vectors $(K(p_s))$, which results in a vector of scalar quantities. The scalar quantities can then be normalized in accordance with expression (5), below:

$$\alpha = \frac{Q(p_e)K(p_s)^T}{\sqrt{C'}} \tag{5}$$

A softmax function can then be applied to weights of the multilayer perceptron of auxiliary network 120, which results in each weight including a value of between 0 and 1. In an example, applying a softmax results in an attention weight for each pixel in a column that represents a subdivision of the polar coordinate representation of second (overhead view) perspective shown in view 250. A softmax function can be in accordance with expression (6), below:

$$\beta[i][j] = \frac{e^{\alpha[i][j]}}{\sum_{j=0}^{j=r} e^{\alpha[i][j]}} \tag{6}$$

wherein $\beta[i][j]$ of expression (6) represents a two-dimensional matrix having a dimension $i \times j$ (where i represents the pixels per column and wherein j represents the number of columns) and having a shape $h_p \times r$. In an example, $\beta[i][j]$ can represent an attention weight for the pixels of the polar coordinate representation of the second (overhead) perspective shown in view 250. In this context, an "attention weight" means mapping a query and a set of key-value pairs to an output, wherein the query $(Q(p_e))$, keys $(K(p_s))$, and values (e.g., a floating-point value between 0 and 1), and output (attention weight $\beta[i][j]$) are vectors.

In an example, each of the sinusoidal position encoding values for each column of the first camera perspective $(p_e)$ can be weighed with an appropriate scalar vector to obtain a feature vector at the pixel positions of the polar coordinate representation of the second (overhead) perspective shown in view 250. Accordingly, the process blocks of expressions (1) through (6) can be repeated until attention weight is obtained for all columns of the polar coordinate representation of second (overhead) perspective shown in view 250. For each pixel (i) of a column (j), a reconstructed feature vector $(F_{reconst\ feat}[i][j])$ is computed each pixel at a distance (r) from a center point of view 250 in accordance with expression (7), below:

$$F_{reconst\ feat}[i]U[j] = \sum_{k=0}^{k=r} \beta[i][k]\left(K(p_s)^T\right)[k] \tag{7}$$

wherein $F_{reconst\ feat}[i][j]$ represents a reconstructed feature in a first (camera) perspective view.

In an example, learning relationships between columns of the reconstructed first (camera) perspective view can utilize a feature pyramid network operating on different scale feature maps from the reconstructed first view. In an example, bilinear interpolation is utilized to compare dimensions of a reconstructed image map $(F_{reconst\ img})$ with image dimensions of scene 200 captured by camera sensor 108A $(F_{original\ img})$. In a bilinear interpolation, dimensions of reconstructed images $(F_{reconst\ img})$ of the first (camera) view are modified to approximate dimensions of image dimensions of scene 200 $(F_{original\ img})$.

In an example, reconstructed feature maps and images of scene 200 captured in a first (camera) perspective can be utilized to learn 3D-2D spatial relationships (e.g., angular position and depth) between reconstructed features and the features of scene 200 captured by camera sensor 108A. In an example, learning of three-dimensional features from a second (overhead view) perspective, auxiliary network 120 and image feature backbone network 375 can be utilized to execute two-dimensional object detection and two-dimensional segmentation tasks. In this context, an "image feature backbone network" means a feature extractor network that computes features from an input image and then up-samples such features by a decoder programming component to generate segmented masks. In an example, image feature backbone network 375 includes a feature encoder that utilizes basic residual network (ResNet) blocks, in which weights of hidden layers of the multilayer perceptron learn residual functions with reference to layer inputs. In this context, a residual network means a type of neural network that uses skip connections or shortcuts to exclude hidden layers of the neural network. In an example, a task output feature map for determining a center point of a two-dimensional image in object detection may utilize a convolution-based foreground/background segmentation mask. The output of image feature backbone network 375 is then sent to scene reconstructor 380 so that detected image features can be assembled into a reconstructed or re-created scene that represents a first (camera) perspective view of scene 200.

In an example, auxiliary network 120 can enforce consistency between two-dimensional features reconstructed from a second (overhead) perspective shown in view 250 and an original two-dimensional feature map obtained from image feature augmenter component 310. A feature map loss function can be computed in accordance with expression (8), below:

$$L_{c\ feat} = \frac{1}{N}\sum(F_{reconst\ feat} - F_{original\ feat})^2 \quad (8)$$

wherein $F_{reconst\ feat}$ represents features reconstructed from a first (camera) perspective, and wherein $F_{original\ feat}$, represents features transmitted from image feature augmenter component 310 via signal path 395.

In an example, auxiliary network 120 can enforce consistency between an image reconstructed from a second (overhead) perspective shown in view 250 and an original image from the first (camera) perspective of scene 200. Enforcement of consistency loss can be computed in accordance with expression (9), below:

$$L_{c\ img} = \frac{1}{N}\sum(F_{reconst\ img} - I)^2 \quad (9)$$

wherein I represents the input image from camera sensor 108A transmitted via signal path 385.

Auxiliary network 120 can additionally enforce task consistency loss between tasks performed by the multilayer perceptron of the auxiliary network. For example, task consistency loss can include loss between detection and segmentation tasks as described in expression (10), below:

$$L_{c\ task} = L_{c\ det} + L_{c\ seg} \quad (10)$$

wherein $L_{c\ det}$ represents the mean square error loss between a heatmap task ($F_{aux\ heatmap}$–$F_{feat\ heatmap}$), which can render areas of an image at different colors or different hues with respect to other areas of an image. A total value for $L_{c\ det}$ can additionally include regression tasks ($F_{aux\ reg}$–$F_{feat\ reg}$) of auxiliary network 120 and an image feature centerpoint network, as depicted in expression (11), below:

$$L_{c\ det} = \frac{1}{N}\sum(F_{aux\ heatmap} - F_{feat\ heatmap})^2 + \frac{1}{N}\sum(F_{aux\ reg} - F_{feat\ reg})^2 \quad (11)$$

In an example, as indicated in expression (12) below, $L_{c\ seg}$ includes the mean square error loss between an image feature segmentation task performed by auxiliary network 120.

$$L_{c\ seg} = \frac{1}{N}\sum(F_{aux\ seg} - F_{feat\ seg})^2 \quad (12)$$

The total loss computed by auxiliary network 120 can then be expressed as expression (13), below:

$$L_{total} = L_{3D\ BEV} + L_{2D\ Perspective} + L_{c\ feat} + L_{c\ img} + L_{c\ task} \quad (13)$$

wherein $L_{3D\ BEV}$ is the three-dimensional overhead view task loss and wherein $L_{2D\ perspective}$ is the 2D first (camera) perspective view task loss. $L_{3D\ BEV}$ loss and $L_{2D\ perspective}$ loss are generic loss functions and change according to the tasks being performed.

Figure 4:
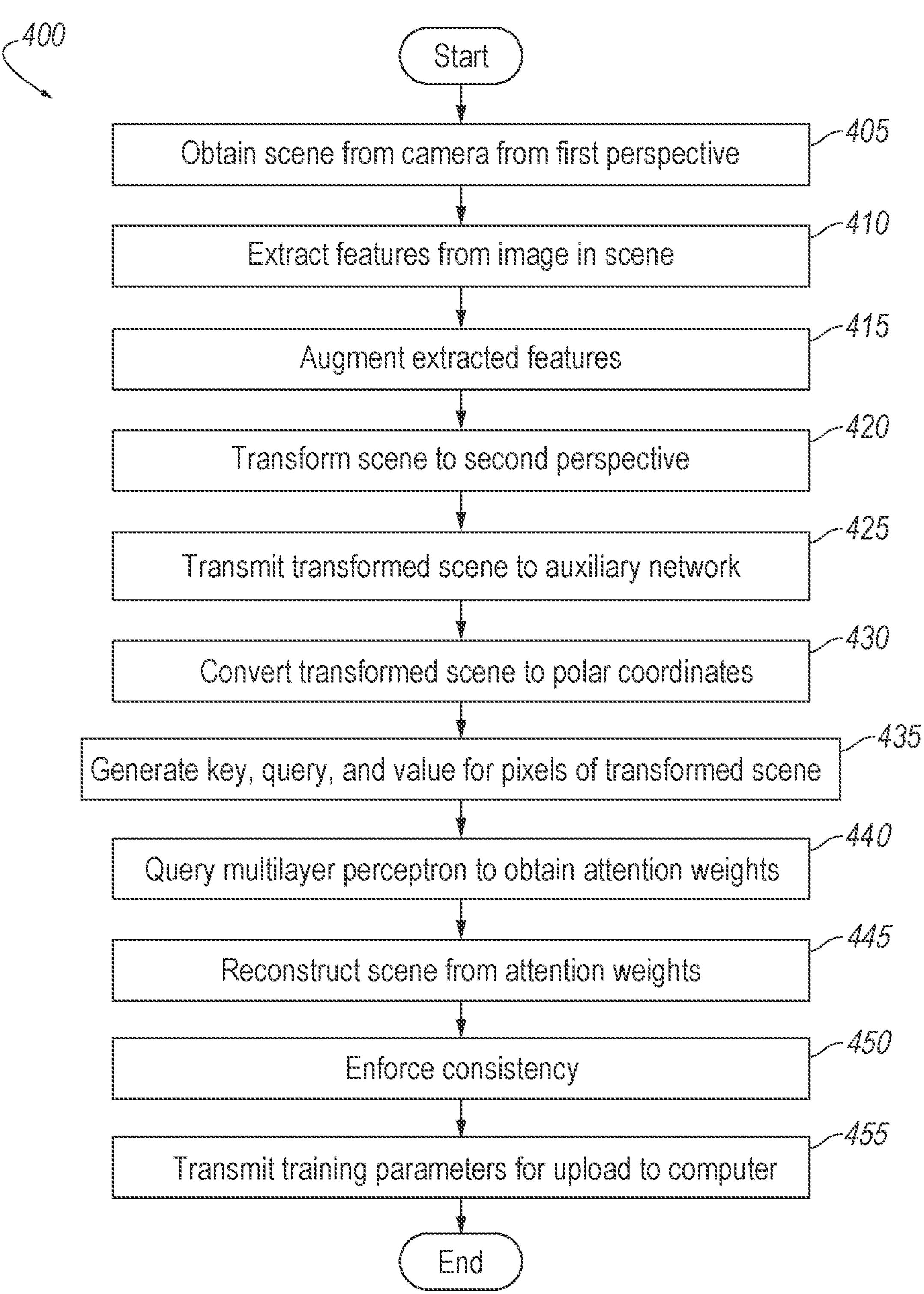
FIG. 4 is a flowchart for a method for sensor object generation via a trained network.

FIG. 4 is a flowchart for process 400 for object pose generation via a trained network. In the example process of FIG. 4, features of scene 200 captured from a first (camera) perspective are extracted and augmented utilizing image feature extractor component 305 of FIG. 3. The extracted images are augmented, such as by applying augmentation of a color space, kernel filtering, image mixing, scaling, etc. The image can be transformed to a second (overhead) perspective shown in view 250. The transformed image can be transmitted to camera perspective transform component 370 of auxiliary network 120, where the transformed image can be converted to polar coordinates. The polar coordinate transformed image can be subdivided into columns in which, for example, each column can represent a 1° sector of the image in the second (overhead view) perspective. Values of the pixels for each column can be encoded and assigned a key for querying a multilayer perceptron of auxiliary network 120. Attention weights can be computed in response to the queries submitted to the multilayer perceptron of auxiliary network 120, in which the attention weights represent pixels transformed from the second (overhead view) perspective to a first (camera) perspective. The pixels can be sent along image feature backbone network 375 to execute two-dimensional object detection and/or two-dimensional segmentation tasks. An output of image feature backbone network 375 can be sent to scene reconstructor 380, which operates to reconstruct a scene captured from the first (camera) perspective based on the second (overhead view) perspective.

The multilayer perceptron of auxiliary network 120 can enforce consistency between the reconstructed scene at an image level, an image feature level, and a task level for tasks performed by the multilayer perceptron. The multilayer perceptron can compute training parameters for uploading to overhead view transform component 104A operating via executing instructions on computer 104. The uploaded training parameters can operate to permit overhead view transform component 104A to operate with reduced latency in converting scene images captured from a first (camera) perspective to a second (overhead view) perspective. As a consequence, computer 104 can reduce processing resources consumed in computing pose of objects external to the vehicle 100, planning motion, and actuating vehicle controls, for example, during autonomous or semi-autonomous operation of vehicle 100, while operating driver assist features or advanced driver assistance system (ADAS) features of the vehicle 100 such as lane-keeping, automated steering, cruise control, etc.

Process 400 begins at block 405, which includes obtaining an image of scene 200 from camera sensor 108A captured from a first perspective.

Process 400 continues at block 410, which includes extracting image features via image feature extractor component 305. Block 410 can include computer 104 executing image processing to detect edges, corners, blobs, ridges, etc., that may be present in images of scene 200. Block 410 may additionally include executing programming to perform scale-invariant feature transforms, template matching, Hough transforms, and/or any other suitable techniques that operate to detect low-level features within images present in scene 200.

Process 400 continues at block 415, which includes computer 104 executing programming to augment detected features, such as color space augmentations, kernel filtering, image mixing, scaling, enhancing brightness and/or contrast, etc., which can operate to emphasize details in images of scene 200 captured from the first (camera) perspective.

Process 400 continues at block 420, which includes computer 104 executing programming to transform (e.g., via overhead view transform component 104A) the scene captured in the first (camera) perspective to a scene from a second (overhead view) perspective, such as depicted in view 250.

Process 400 continues at block 425, at which computer 104 transmits the transformed scene to auxiliary network 120. Auxiliary network 120 can include a multilayer perceptron or another type of neural network that can operate to reconstruct scene 200 captured from a first (camera) perspective based on a second (overhead view) perspective (e.g., view 250).

Process 400 continues at block 430, at which auxiliary network 120 can execute instructions (e.g., via camera perspective transform component 370). Block 430 can include subdividing pixels of overhead view 250 to a polar coordinate system that represents sectors (e.g., 1° sectors, 2° sectors, 3° sectors, etc.) and arranging pixel values or each pixel of the scene into columns. Subdividing of a scene in an overhead view can be in accordance with expressions (1) and (2).

Process 400 continues at block 435, at which camera perspective transform component 370 generates queries to the multilayer perceptron of auxiliary network 120. Each query can include an encoded pixel value and a key value, such as a floating-point value between 0 and 1. In an example, the auxiliary network may utilize sinusoidal encoding of each pixel in a column. Encoding of pixel values can be in accordance with expression (3).

Process 400 continues at block 440, which includes auxiliary network 120 querying the multilayer perceptron utilizing the queries generated at block 435. A query can take a form similar to that of expression (4). A query ($Q(p_e)$) of expression (4) can be normalized in accordance with expression (5).

Process 400 continues at block 445, which includes auxiliary network 120 obtaining attention weights from the multilayer perceptron of auxiliary network 120. Computing attention weights can be in accordance with expressions (6) and (7) obtained for all columns of pixels in the polar coordinate representation of the second (overhead view) perspective shown in view 250.

Process 400 continues at block 450, which includes enforcing consistency loss between weights computed by the multilevel perceptron of auxiliary network 120 and feature maps representing features detected by image feature augmenter component 310 and reconstructed features detected by image feature backbone network 375 (e.g., via expression (8)). Block 450 can additionally include enforcing consistency loss between images reconstructed by scene reconstructor 380 and scene 200 captured by camera sensor 108A (e.g., via expression (9)). Block 450 can additionally include enforcing consistency loss between output feature maps within the multilayer perceptron of auxiliary network 120 (e.g., via expressions (10), (11), (12)). A total loss computed by auxiliary network 120 can be expressed in accordance with expression (13).

Process 400 continues at block 455, which includes auxiliary network 120 transmitting training parameters to be uploaded to computer 104. Consequently, overhead view transform component 104A can execute transformations from a first (camera) perspective to a second (overhead view) while consuming decreased processing resources. Executing such transformations can assist in generating pose of objects viewable by camera sensor 108A mounted on vehicle body 102. Object pose generation can be utilized by motion planner component 360 to actuate one or more of the propulsion system of vehicle components 110, a steering system of components 110, or HMI 112. For example, computer 104 may actuate one or more of components 110 executing an advanced driver assistance system (ADAS). ADAS are electronic technologies that assist drivers in driving and parking functions. Examples of ADAS include lane-departure detection, blind-spot detection, adaptive cruise control, and lane-keeping assistance. Computer 104 may actuate a system of vehicle 100 to stop the vehicle before reaching a static or moving object in a scene captured by camera sensor 108A, according to an algorithm that operates without human input. Computer 104 may operate vehicle 100 autonomously, i.e., the propulsion system, and/or the steering system, based on output signals from motion planner component 360.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above and can be accessed via a network in any one or more of a variety of manners. A file system may be accessible from a computer operating system and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It should further be understood that certain steps could be performed simultaneously, that other steps could be added, or that certain steps described herein could be omitted. Operations, systems, and methods described herein should always be implemented and/or performed in accordance with an applicable owner's/user's manual and/or safety guidelines.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance, order, or quantity. Use of "in response to" and "upon determining" indicates a causal relationship, not merely a temporal relationship. Many modifications and variations of the present disclosure are possible in light of the above teachings, and the disclosure may be practiced otherwise than as specifically described.

What is claimed is:

1. A system, comprising:

a computer having a processor and a memory, the memory including instructions executable by the processor to:

extract a feature of an object viewable in a scene captured by a camera at a first perspective;

transform the scene from the first perspective to a second perspective based on a parameter generated responsive to (a) a reconstruction of the scene from the first perspective based on the scene from the second perspective, and (b) an adjustment of the parameter to minimize differences between the extracted feature and a representation of the extracted feature reconstructed based on the second perspective, wherein the parameter is derived from a weight of a multilayer perceptron that is learned responsive to the reconstruction of the scene from the first perspective based on the scene from the second perspective;

determine a depth of the extracted feature with respect to the camera based on the parameter; and determine a pose of the object based on the determined depth.

2. The system of claim 1, wherein the instructions include instructions to: actuate a vehicle component based on the determined pose of the object.

3. The system of claim 2, wherein the vehicle component is a steering component or a propulsion component.

4. The system of claim 1, wherein the second perspective is an overhead view.

5. The system of claim 1, wherein the second perspective is a bird's-eye view, and wherein the reconstruction of the scene includes instructions to convert pixels of the scene from the second perspective to a polar coordinate system.

6. The system of claim 5, wherein the reconstruction of the scene includes instructions to transmit a query and a position key in the polar coordinate system to a multilayer perceptron.

7. The system of claim 5, wherein the reconstruction of the scene includes instructions to transmit a query and a position key in the polar coordinate system to a multilayer perceptron, and wherein the instructions further include instructions to compute an attention weight.

8. The system of claim 1, wherein the adjustment of the parameter includes instructions to implement bilinear interpolation between a dimension of the extracted feature and a dimension of the representation of the extracted feature by a multilayer perceptron.

9. The system of claim 1, wherein adjustment of the parameter includes instructions to minimize differences between the scene captured at the first perspective and a reconstruction of the captured scene from the second perspective.

10. The system of claim 1, wherein adjustment of the parameter includes instructions to minimize differences between a first task output feature map obtained for the scene captured at the first perspective and a second task output feature map obtained for the extracted feature reconstructed based on the second perspective.

11. A method, comprising:

extracting a feature of an object viewable in a scene captured by a camera at a first perspective;

transforming the scene from the first perspective to a second perspective based on a parameter generated responsive to (a) reconstructing of the scene from the first perspective based on the scene from the second perspective, and (b) adjusting the parameter to minimize differences between the extracted feature and a representation of the extracted feature reconstructed from the second perspective, wherein the parameter is derived from a weight of a multilayer perceptron that is learned responsive to the reconstruction of the scene from the first perspective based on the scene from the second perspective;

determining a depth of the extracted feature with respect to the camera based on the parameter; and determining pose of the object based on the determined depth.

12. The method of claim 11, wherein the method further includes: actuating a vehicle component based on the determined pose of the object.

13. The method of claim 12, wherein the vehicle component is a steering component or a propulsion component.

14. The method of claim 11, wherein the second perspective is an overhead view.

15. The method of claim 11, wherein the second perspective is a birds'-eye view.

16. The method of claim 11, wherein adjusting the parameter includes implementing a bilinear interpolation between a dimension of the extracted feature from the captured scene and a dimension of the representation of the extracted feature reconstructed by a multilayer perceptron.

17. The method of claim 11, wherein adjusting the parameter includes minimizing differences between the scene captured at the first perspective and a reconstruction of the captured scene from the second perspective.

18. The method of claim 11, wherein adjusting the parameter includes minimizing differences between a first task output feature map obtained for the scene captured at the first perspective and a second task output feature map obtained for the scene reconstructed based on the second perspective.

19. A system, comprising:

a computer having a processor and a memory, the memory including instructions executable by the processor to:

extract a feature of an object viewable in a scene captured by a camera at a first perspective;

transform the scene from the first perspective to a second perspective based on a parameter generated responsive to (a) a reconstruction of the scene from the first perspective based on the scene from the second perspective, and (b) an adjustment of the parameter to minimize differences between the extracted feature and a representation of the extracted feature reconstructed based on the second perspective, wherein the second perspective is a bird's-eye view, and wherein the reconstruction of the scene includes instructions to convert pixels of the scene from the second perspective to a polar coordinate system;

determine a depth of the extracted feature with respect to the camera based on the parameter; and determine a pose of the object based on the determined depth.

20. The system of claim 19, wherein the reconstruction of the scene includes instructions to transmit a query and a position key in the polar coordinate system to a multilayer perceptron.

* * * * *